No. 884,531. PATENTED APR. 14, 1908.
H. E. SHROCK.
NUT LOCK.
APPLICATION FILED DEC. 31, 1907.
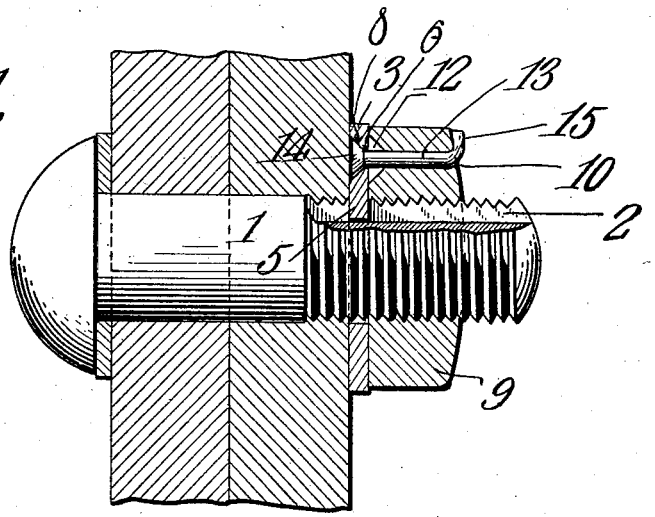
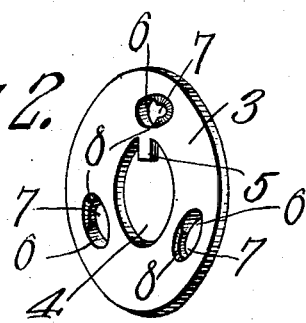
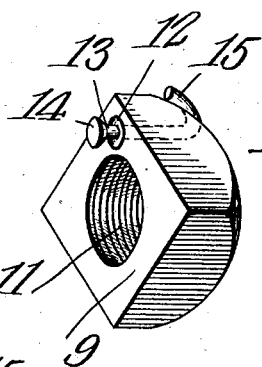
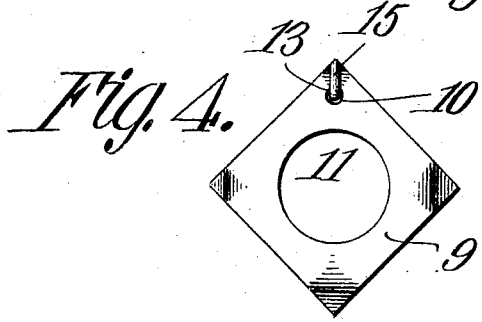
Witnesses
Inventor
Harry E. Shrock,
By C. A. Snow & Co
Attorneys

UNITED STATES PATENT OFFICE.

HARRY E. SHROCK, OF KOKOMO, INDIANA.

NUT-LOCK.

No. 884,531.        Specification of Letters Patent.        Patented April 14, 1908.

Application filed December 31, 1907. Serial No. 408,728.

*To all whom it may concern:*

Be it known that I, HARRY E. SHROCK, a citizen of the United States, residing at Kokomo, in the county of Howard and State of Indiana, have invented a new and useful Nut-Lock, of which the following is a specification.

This invention relates to nut locks; and has for its object to provide a simple, secure and safe lock for nuts which will prevent them from becoming loose on their bolts by vibrations or jarring of any kind, but which may be removed when necessary and again locked without destroying or injuring either the nut or its lock.

To this end the invention consists of the novel combination and arrangement of parts hereinafter described and claimed and illustrated in the accompanying drawing forming a part of this specification, in which Figure 1 is a part sectional view of the invention shown applied and the nut locked. Fig. 2 is a perspective view of the washer used with this invention; Fig. 3 is a similar view of the nut with its locking pin, and Fig. 4 is a view of the top face of the nut.

Similar reference numerals are used for the same parts in all the figures.

A bolt 1 of well known type has a longitudinal groove 2 in one side throughout the length of its threaded portion on which bolt a washer 3, provided with a central opening 4, is adapted to slide freely, but prevented from rotating by means of a lug 5 projecting into the opening 4 and into the slot 2 of the bolt. Through the washer 3 are made a plurality of circular holes 6 their axes concentric with the central opening 4 and preferably spaced an equal distance apart. Connected to the corresponding side of each hole 6 is a short slot 7, narrower than the diameter of the holes and concentric with the axis of the washer. On one side or face of the washer 3 the slots 7 are countersunk, the countersink 8 extending from the edge of each hole to and around the end of each slot 7 as clearly shown in Fig. 2.

The nut 9 in all respects resembles the nuts now in use except that a small hole 10, parallel to the threaded bolt hole 11, is bored through the nut, preferably in one corner, and countersunk on its under side as at 12. Within this hole is loosely fitted a sliding pin 13 having a head 14 on its under side and its upper end 15 bent over to prevent the pin dropping out of the hole 10. Instead of bending the end of the pin 13 a head may be formed thereon after it has been placed in the hole 10 as is obvious.

To use the nut lock, the bolt 1 is passed through the parts to be fastened and the washer 3 slipped on the bolt as far as it will go. The nut is then screwed on in the usual manner until the parts are tightly bolted. The pin is then pushed inwardly and if it be in alinement with one of the holes 6, its head will pass through said hole, but if in any other position the nut must be turned until the pin is brought in alinement. After the pin enters the hole 6 the nut is turned backwardly carrying the pin into the slot 7 in communication with the hole 6 containing the pin. The head rests in the countersink below or in the same plane as the surface of the washer so that the latter has a firm bearing on the part clamped. The countersink 12 in the nut also receives the head of the pin before it enters the hole 6 so that the nut will have a square bearing on the washer. As thus constructed the nut is restrained from turning by the pin engaging the slot in the washer, and the latter is held against rotation by the lug 5 in the groove of the bolt. The nut may be readily removed by turning it in a forward direction until the head of the pin enters the hole 6, then on withdrawing the pin from the hole the nut may be unscrewed.

What is claimed is:

1. A nut lock comprising a bolt with a longitudinal groove, a washer having a lug to engage said groove and provided with a plurality of circular openings each opening connected with a slot on one side, and a nut having a slidable pin extending therethrough and headed on the under side adapted to engage one of the holes in said washer and be locked thereto by a backward turn of the nut.

2. A nut lock comprising a bolt having a longitudinal groove, a washer having a lug to engage said groove and provided with a plurality of concentrically disposed holes, each hole having a slot on one side narrower than the diameter of said hole said slots being countersunk, and a nut having a slidable pin passing therethrough and headed on the under side and adapted to pass through said hole and be carried into said slot by a reverse turn of the nut, said head entering the countersunk portion of the slot.

3. In a lock nut, a bolt, a non-rotatable washer having a plurality of spaced holes therethrough concentrically disposed and with concentric slots narrower than the diameter of said holes leading from corresponding sides thereof, said slots being countersunk on one side of said washer, a nut, and a pin passing loosely through a hole in said nut and slidable therein, said pin having a head on its under side adapted to enter one of said holes in the washer and be locked thereto by a reverse turn of the nut carrying the pin into the slot leading from said hole.

4. A lock nut comprising a bolt, a non-rotatable washer having a plurality of spaced holes therethrough concentrically disposed and with a short curved slot leading from the corresponding side of each hole, and a nut with a slidably headed pin adapted to enter one of said holes and be locked to said washer by a backward turn of said nut.

In testimony that I claim the foregoing as my own, I have hereto affixed my signature in the presence of two witnesses.

HARRY E. SHROCK.

Witnesses:
JOHN L. ZERBE,
GEORGE W. SMITH.